Figure 1:
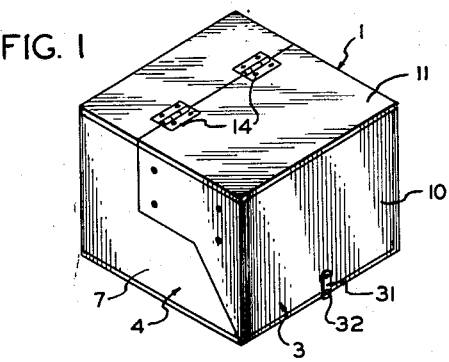

March 23, 1954 R. E. HERRICK 2,672,921
CASE CONVERTIBLE TO DESK AND SEAT
Filed Jan. 11, 1949 6 Sheets-Sheet 1

*INVENTOR.*
R. E. HERRICK
BY
*A. Yates Dowell*
ATTORNEY

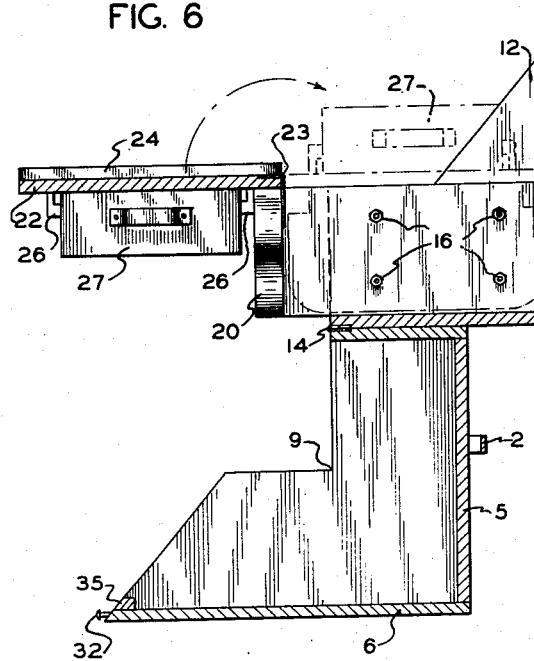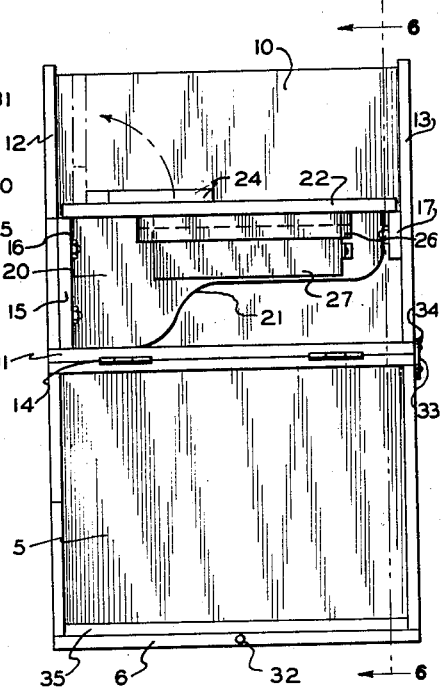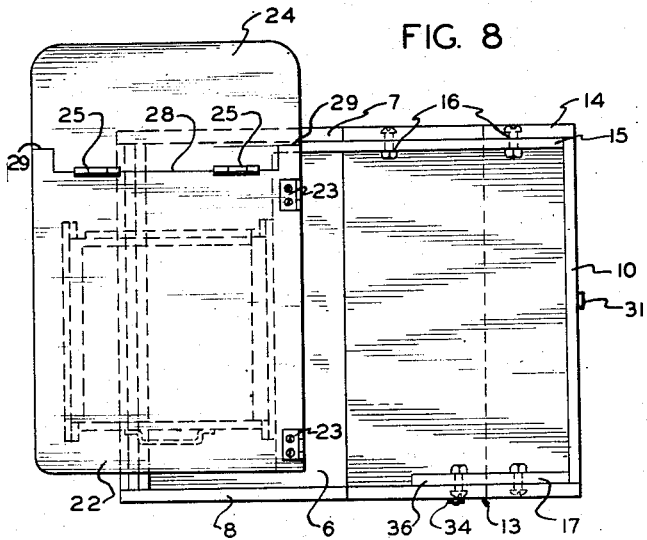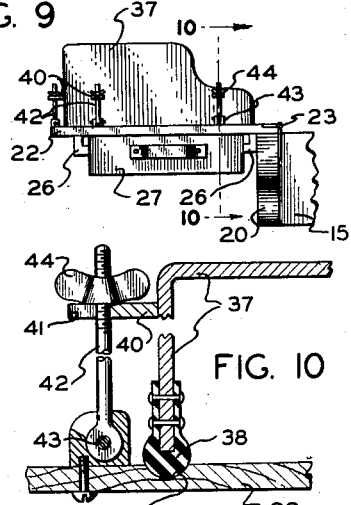

March 23, 1954     R. E. HERRICK     2,672,921
CASE CONVERTIBLE TO DESK AND SEAT
Filed Jan. 11, 1949     6 Sheets-Sheet 3
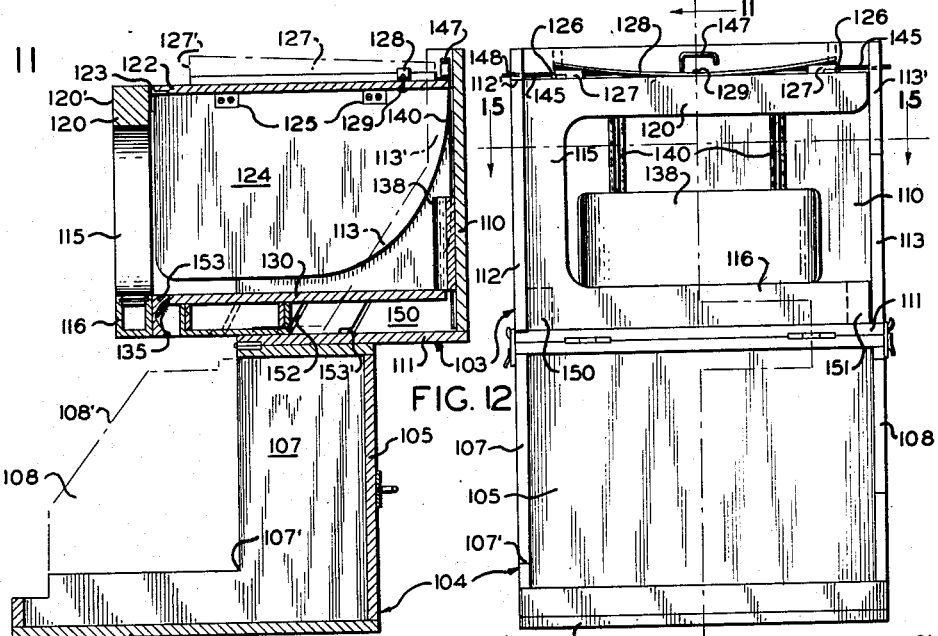
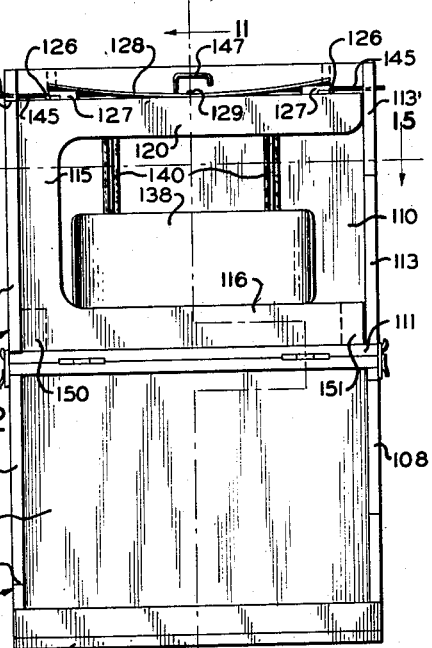
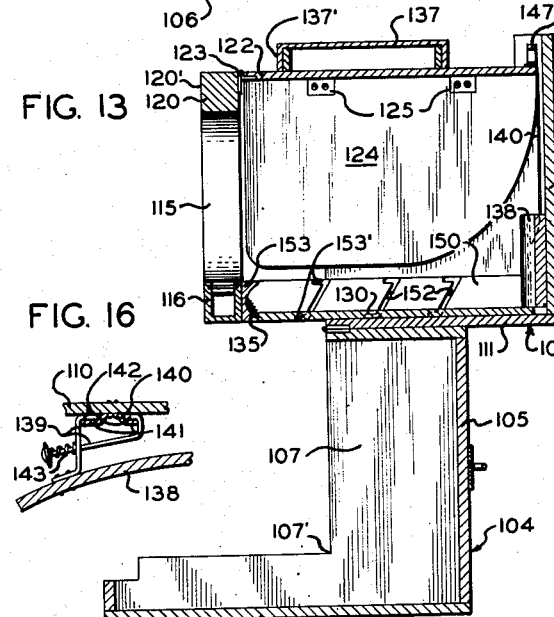
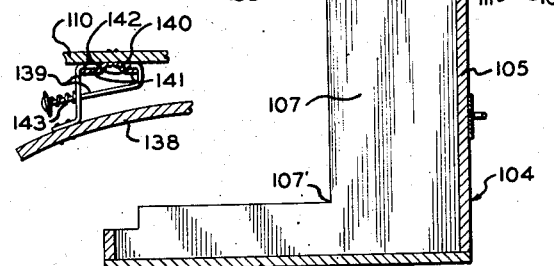
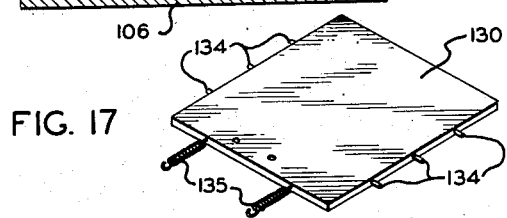
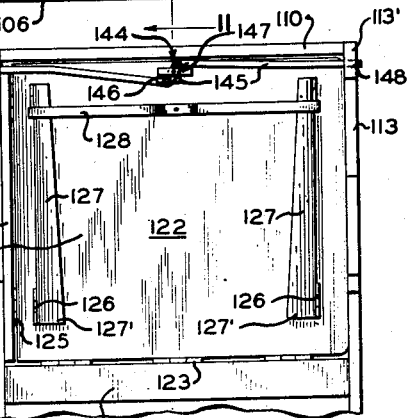
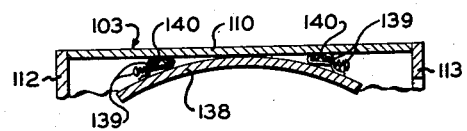
INVENTOR.
R. E. HERRICK
BY
*A. Yates Dowell*
ATTORNEY March 23, 1954  R. E. HERRICK  2,672,921
CASE CONVERTIBLE TO DESK AND SEAT
Filed Jan. 11, 1949  6 Sheets-Sheet 4

INVENTOR.
R. E. HERRICK
BY
ATTORNEY

March 23, 1954 R. E. HERRICK 2,672,921
CASE CONVERTIBLE TO DESK AND SEAT
Filed Jan. 11, 1949 6 Sheets-Sheet 5

INVENTOR.
R. E. HERRICK
BY
A. Yates Dowell
ATTORNEY

March 23, 1954     R. E. HERRICK     2,672,921
CASE CONVERTIBLE TO DESK AND SEAT
Filed Jan. 11, 1949     6 Sheets-Sheet 6

INVENTOR.
R. E. HERRICK
BY
ATTORNEY

Patented Mar. 23, 1954

2,672,921

UNITED STATES PATENT OFFICE 2,672,921

CASE CONVERTIBLE TO DESK AND SEAT

Robert E. Herrick, Chicago, Ill.

Application January 11, 1949, Serial No. 70,309

4 Claims. (Cl. 155—124)

This invention relates to supports and more particularly to a combination carrying case and desk for a typewriter or other instrument and an adjustable base by means of which the typewriter may be positioned in accordance with the desires of the user.

The invention is particularly adapted but not limited to the provision of a receptacle or container for a typewriter or similar instrument which is adapted by reason of its unique construction to serve as a support for the typewriter and a seat for the user thereof. Other features of this device include a receptacle associated with the typewriter support for the storing of various articles, a cover for the typewriter which is adapted to protect it from the elements and other undesirable substances, and a base which is adjustable to accommodate substantially all makes and sizes of typewriters and which may be easily positioned in accordance with the wishes of an operator.

Combination typewriter cases and tables have been used heretofore but these have not included all of the advantages found in the applicant's device such as compactness, lightness in weight, durability, rigidity, and also the provision of a seat for the operator.

The need for a portable typewriter stand or support for use in the field has long been recognized but weight and space requirements have oftentimes prohibited the transporting of stands and chairs and the like for use with a typewriter. This invention is particularly concerned with the solving of this problem by providing a lightweight and compact carrying case for a typewriter or the like which may be converted into a combination desk and chair.

Accordingly it is an object of the present invention to provide a carrying case for a typewriter, or the like, which is lightweight and compact.

A further object of the invention is the provision of a carrying case for a typewriter which is adapted to support it in operative position and an operator in position for using the machine.

A further object of the invention is the provision of a typewriter support which is adjustable to accommodate machines of various dimensions and which is adjustable to and from the operator's position.

A further object is the provision of a mount for securing a typewriter to a support, to which locking means may be applied for preventing unauthorized removal of the machine.

A further object of the invention is the provision of a carrying case for a typewriter in which a substantially waterproof cover is provided in order to protect the machine from the elements and from other undesirable substances.

Figure 2:
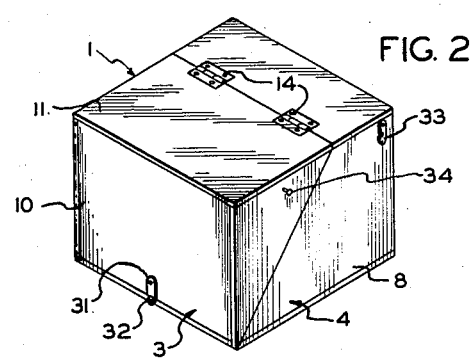
Figure 3:
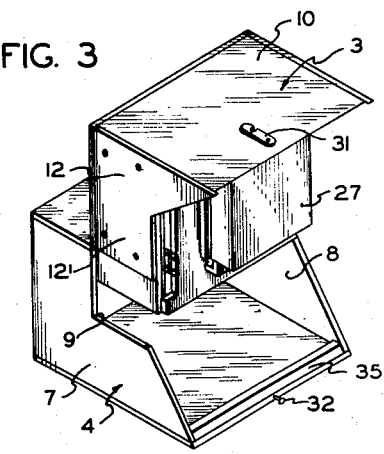
Figure 4:
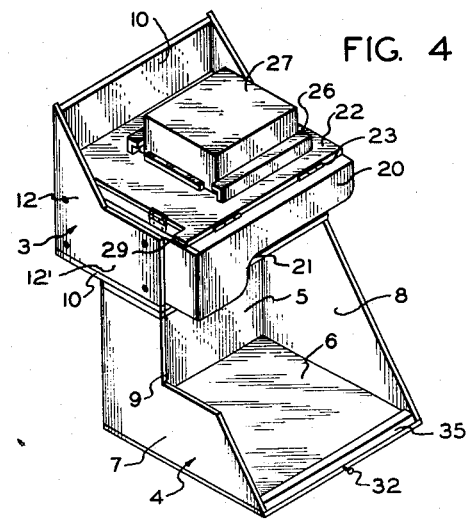
Figure 5:
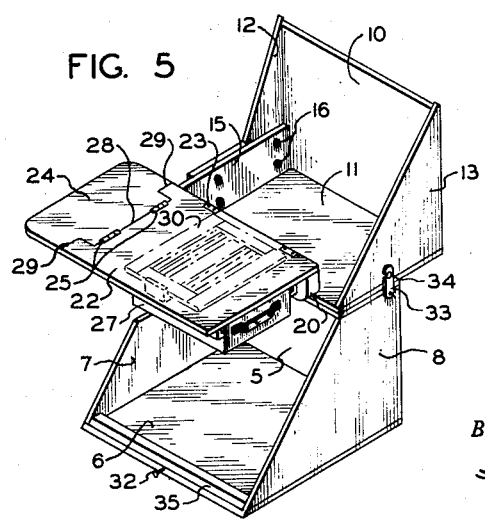
Figure 18:
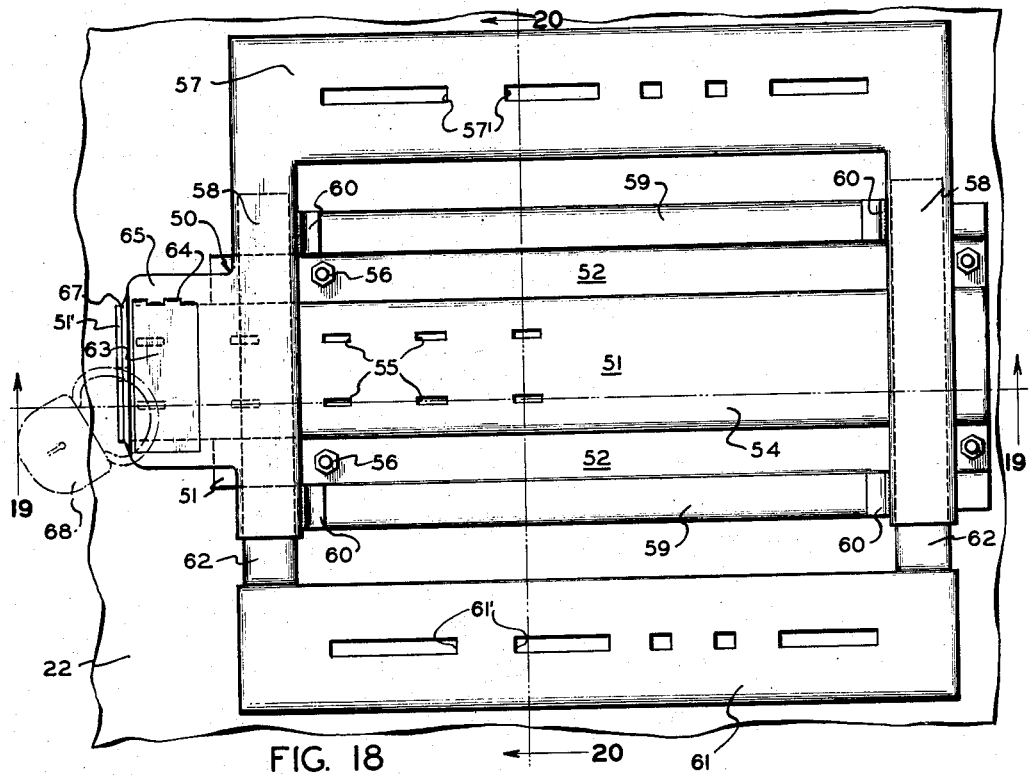
Figure 19:
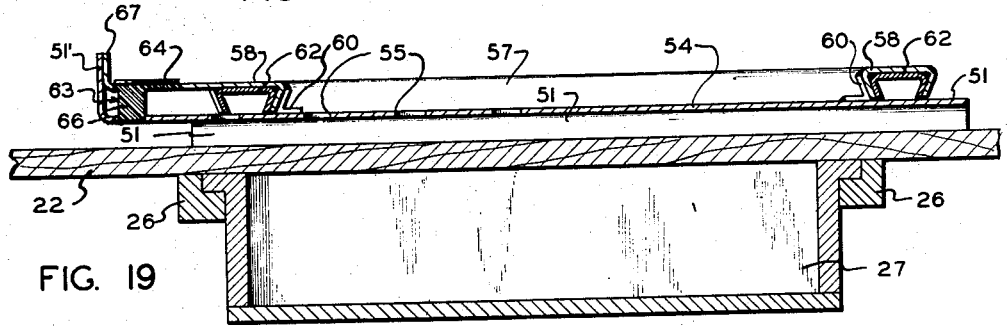
Figure 20:
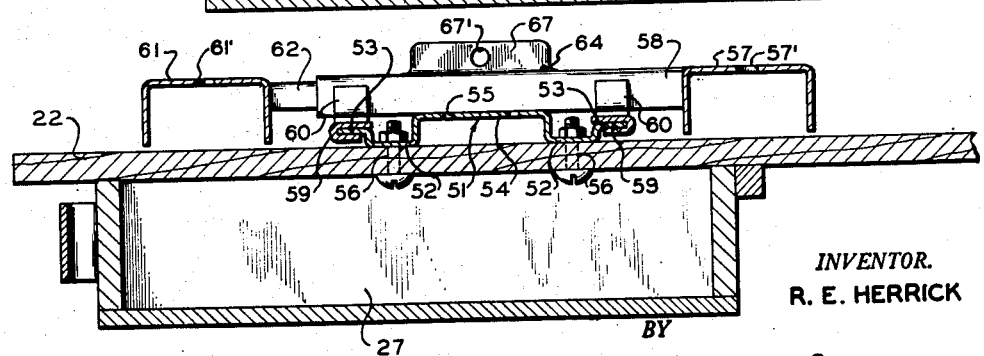
Figures 21, 22, 23:
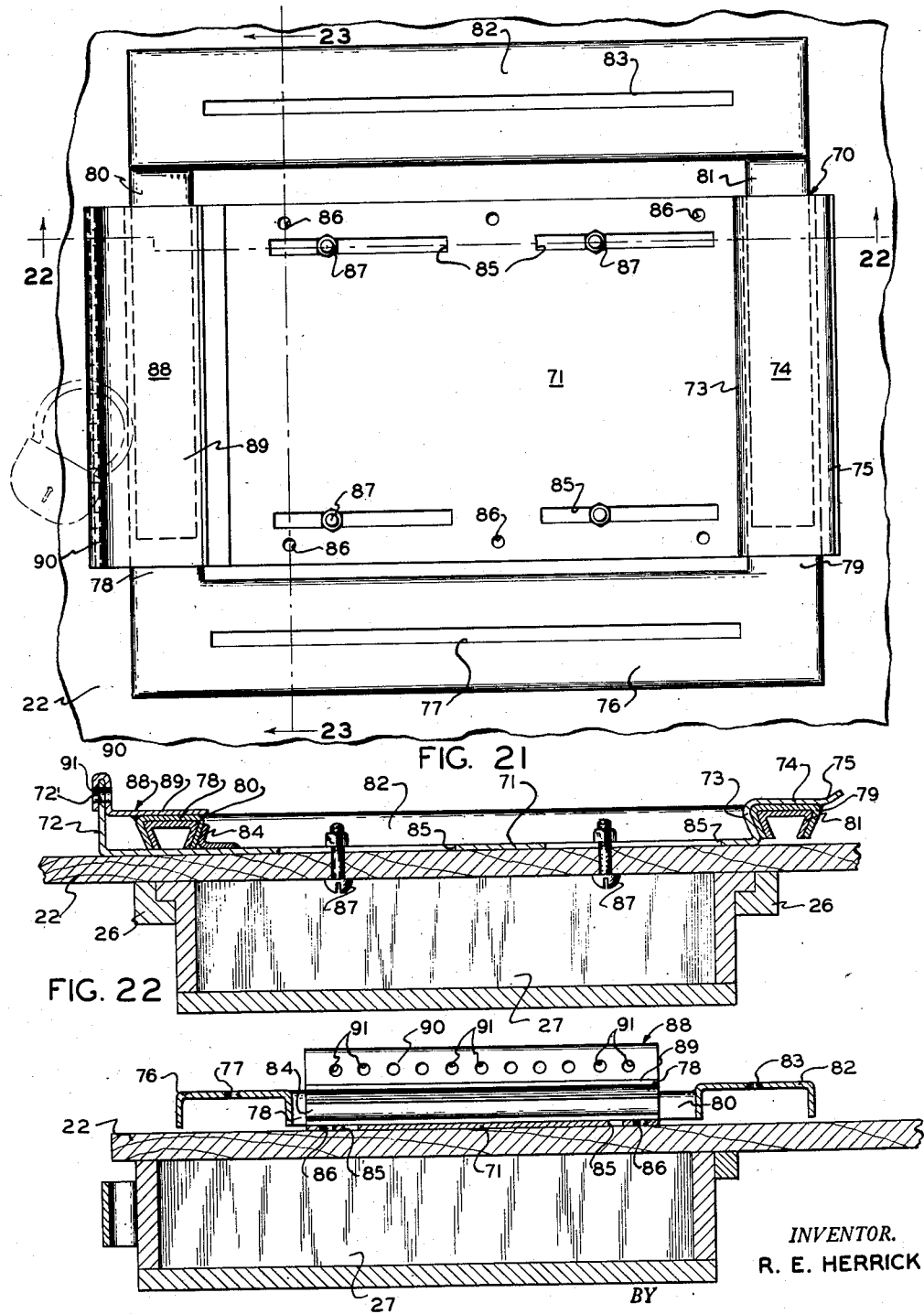
Figure 24:
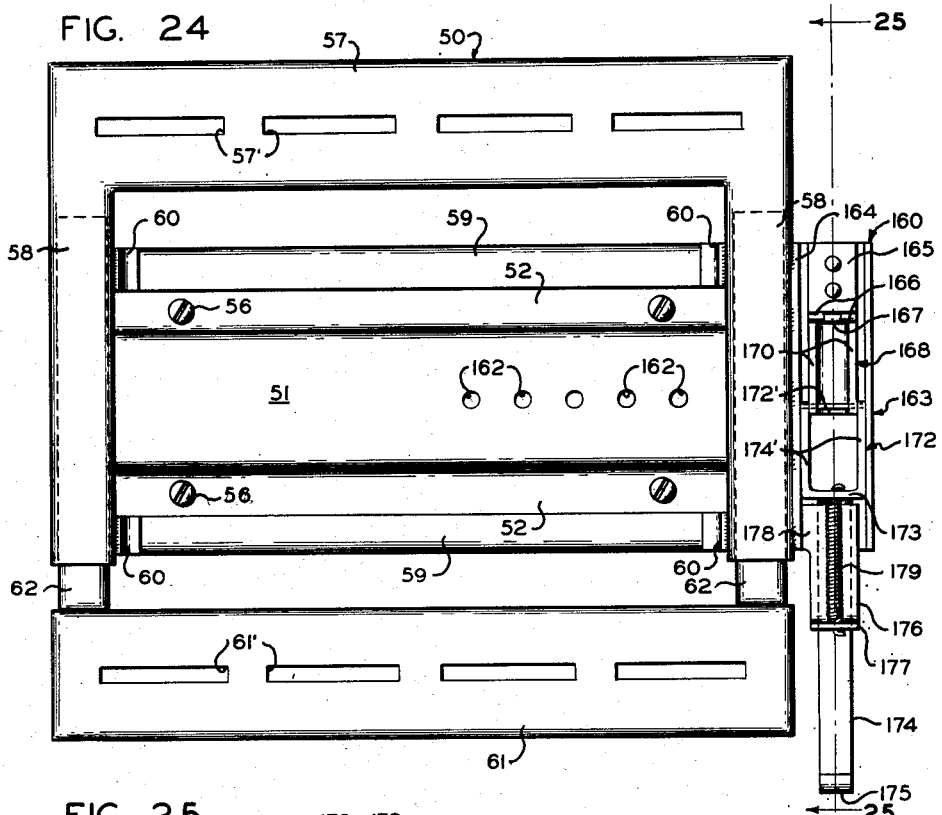
Figure 25:
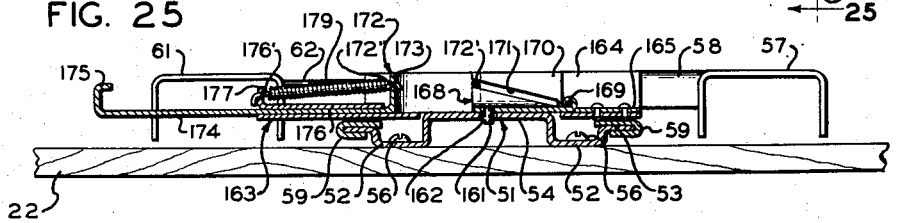

These and other objects of the invention will become apparent from the following description taken in conjunction with the accompanying drawings wherein:

Figs. 1 and 2 are perspectives of a container constructed in accordance with the present invention and showing views from different sides of the closed receptacle;

Fig. 3, a perspective of the device in partly open position;

Fig. 4, a perspective of a further stage in the setting up of the device;

Fig. 5, a perspective of the device in operative position;

Fig. 6, a vertical section on line 6—6 of Fig. 7 of the device in operative position with a portion, shown in phantom, in the position corresponding to that of Fig. 4;

Fig. 7, a front elevation of the device shown in Fig. 6;

Fig. 8, a plan view of the device shown in Fig. 6;

Fig. 9, a fragmentary side elevation showing a typewriter cover constructed in accordance with the present invention and supported on the device;

Fig. 10, a section on the line 10—10 of Fig. 9;

Fig. 11, a vertical section through a modified device taken on the line 11—11 of Fig. 12, with the sides of the sections nearest the observer in phantom;

Fig. 12, a front elevation of the device shown in Fig. 11;

Fig. 13, a vertical section similar to Fig. 11 of a modified form;

Fig. 14, a top plan view of the device shown in Figs. 11 and 12;

Fig. 15, a section on the line 15—15 of Fig. 12;

Fig. 16, a detail of the back adjusting mechanism shown in Fig. 15;

Fig. 17, an isometric of the adjustable seat member;

Fig. 18, a plan view of a typewriter mount or base constructed in accordance with the present invention;

Fig. 19, a section on the line 19—19 of Fig. 18;

Fig. 20, a section on the line 20—20 of Fig. 18;

Fig. 21, a plan view of a modified base;

Fig. 22, a section on the line 22—22 of Fig. 21;

Fig. 23, a section on the line 23—23 of Fig. 21;

Fig. 24, a top plan view of an instrument mount similar to that shown in Fig. 18 and including releasable position locking means;

Fig. 25, a section on the line 25—25 of Fig. 24; and

Figure 26:
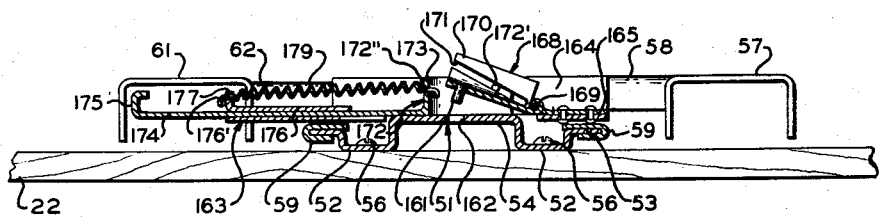

Fig. 26, a section similar to that in Fig. 25 showing the parts in another position.

With continued reference to the drawing, the invention contemplates a container or carrying case 1 which when folded as shown in Figs. 1 and 2 forms substantially a rectangular solid. It is understood of course that the invention is not limited to the exact configuration shown but that other proportions or shapes are within its purview. A handle 2 may be attached to the container in such a position that it may be conveniently carried.

The container is comprised of symmetrical sections 3 and 4, which are adapted to mate together to form an enclosure, or to be positioned with the section 3 in upper position resting on the lower section 4. The lower section includes perpendicular rectangular rear and bottom wall members 5 and 6 and substantially parallel trapezoidal side wall members 7 and 8. The side member 7 is provided with a notch 9 for a purpose later to be described. The upper section includes perpendicular rectangular rear and bottom wall members 10 and 11 to which are attached substantially triangular side members 12 and 13. The side wall 12 is provided with an extended portion 12' for reception in the notch 9 of the lower section side wall member.

Rigidly attached to the side wall 12 of the upper section 3 is a supporting bracket 15 which is secured by a plurality of fasteners 16. The extended portion 12' of the side wall 12 provides additional support for the bracket.

Suitably secured to the free end of the bracket 15 is an arm or supplementary supporting member 20. This may be attached to the bracket by dovetailing or other rigid conventional means. The arm 20 has a cutout portion 21 to provide additional room for the knees of the user of the device.

A base or platform 22 is pivotally attached by hinges 23 to an edge of the arm 20. In placing the base 22 in operative position it is rotated about the hinge 23 from the position shown in Fig. 4 to the position shown in Fig. 5. A leaf 24 is pivotally attached to the base 22 by means of hinges 25 in order to provide an extended supporting surface for the device. The hinges for supporting the leaf 24 are attached to an offset portion 28 of the base 22 in order that the leaf 24 may be folded out of the way as shown in Fig. 4 and that the projecting members 29 of the base may rest on the edge of the bracket.

A supporting block 17 is attached to the side wall 13 of the upper section 3 to provide a support for the side of the base 22 furthest from the projecting members 29, when the device is in the position shown in Fig. 4.

Slidably engaged by angle members 26 which are secured to the base 22 is a drawer 27. A mount 30, shown in phantom in Fig. 5, is adapted to adjustably support a typewriter of conventional design and will be more fully described later.

A latch 31 is attached to the upper member 3 for receiving a pin or keeper 32 attached to the lower member in order that the device may be maintained in closed position.

Similarly a latch 33 is attached to the lower member 4 and is adapted to receive a pin or keeper 34 attached to the upper member 3 for maintaining the sections in open position.

For strengthening and improving the rigidity of the lower section 4, which supports the entire structure, a strut or bar 35 is attached between the side members of the section.

In the use of the device the operator may easily carry the same in folded position by means of the handle 2 or it may be transported as an article of cargo in a vehicle or the like. When it is desired to use the same the latch 31 may be released and the open section rotated about the hinge 14 relative to the lower section through the positions shown in Figs. 3 and 4. Then the base 22 is rotated about the hinge 23 from the position shown in Fig. 4 to that of Fig. 5. The leaf 24 may also be extended as shown in the latter figure. It is contemplated that a typewriter be attached to the base 22 either directly or by means of the adjustable mount shown in phantom in Fig. 5 and to be described later. The operator may then sit on the seat which is provided by the members 3 and 4 in open position as shown in Fig. 5.

In order to protect the typewriter from the elements, insects, and other undesirable substances frequently encountered in the field, a cover 37 is provided which is shaped to conform generally to the outline of the machine. The cover has a gasket 38 on its lower rim which is adapted to be received by a groove 39 in the base 22. A plurality of ears 40 having slots 41 are attached to the sides of the cover 37 and are adapted to receive the shanks of bolt members 42 attached to lugs 43 which are secured to the base. A wing nut or other suitable fastening means 44 is secured to each of the bolts for clamping the cover in intimate contact with the base.

In Figs. 11 to 17, inclusive, a modified form of the device is shown. This is constructed to function similarly to that of the device shown in Figs. 1 to 8, inclusive, and is comprised of symmetrical mating sections 103 and 104 which may be closed to form a container, or positioned with the section 103 resting on the lower section 104 as shown in Fig. 11. The lower section includes perpendicular rectangular rear and bottom members 105 and 106 and substantially parallel side walls 107 and 108. The wall member 107 is relatively narrow and is provided with a notch 107' for the reception of a mating projection on the upper section.

The upper section includes perpendicular rectangular rear and bottom wall members 110 and 111 to which are attached side wall members 112 and 113. The wall member 112 is substantially rectangular and is provided with a projection 112' adapted to be received by the notch 107' of the lower section, and to mate with the lower section to form a wall of the container. The wall 113 is substantially triangular with a rectangular projection 113' and is adapted to mate with the wall 108 of the lower section having a beveled edge 108'. For supporting the yoke and seat, later to be described, a framework is provided and includes side rails 150 and 151 supported on the bottom member 111 of the top section 103. An end rail 153 is placed across the side rails near their extremities and adjacent to leg 116 of the yoke for affording additional rigidity and for extension of the surface of the seat, later to be described. The side rails are attached to the member 111 just within the side members 112 and 113.

A U-shaped support or yoke 115 has a leg 116 attached to the ends of the side rails 150 and 151, the inner surface of the leg and the upper surface of the end rail occupying substantially the same plane. The other leg 120, of the yoke, is spaced from the leg 116 in order to provide room for the legs of an operator. The loop of the yoke is attached to the forward edge of the side wall member 112.

The upper leg 120 of the yoke provides a support for a base or platform 122 which is pivotally attached thereto by hinges 123, in a manner similar to that of the platform 22 in Figs. 4 and 5.

A leaf 124 is pivotally attached to the side of the platform 122 by means of hinges 125 to provide an extension of the supporting surface.

Pivotally attached by hinge members 126 to the bottom of platform 122 are a pair of tapered ledgers or braces 127 which may lie flat when not being used or may be rotated substantially perpendicular to the base as shown in phantom in Fig. 11. A bowed leaf spring 128 is attached by a pin or the like 129 to the underside of the support 122 and is positioned with its extremities in engagement with the narrower portion of the ledgers 127 in order to lock the same in either of the two positions. When it is desired to position the device for use the ledgers are raised and locked by spring 128 and in this position their wider ends 127' are adapted to engage the side 120' of the upper arm 120 of the yoke. This provides additional supporting and stabilizing means for the platform resting on the yoke.

A seat member 130 is positioned in the upper section 103 between the walls 112 and 113, and spaced from the lower wall 111 of the section. The seat is carried by the side rails 150 and 151 having inclined grooves 152 in their facing sides. The inclined grooves have angular end portions 153' which are substantially parallel to the plane of the seat 130. The seat consists of a substantially flat rectangular member and has a plurality of pegs or projections 134 at either of its sides and spaced in accordance with the spacing of the grooves 152 and adapted to be received thereby. At an end of the seat spring members 135 are attached and the other ends of the springs are attached to the rail 153 so that the seat is normally biased towards the yoke. The projections on the seat may rest in the upper or lower angular groove portions 153' and retained from movement into the groove by means of the spring 135.

Where a relatively low machine is to be carried in the device, the seat may be left in raised position and a drawer used, as shown in Fig. 11 of the drawings, positioned in the space under the seat and guided by suitable runners.

On the other hand, where a relatively higher machine is employed the seat must be lowered in order to accommodate the instrument when the container is in the carrying position. For this situation a drawer 137 may be suitably positioned under the support 122 as shown in Fig. 13. The edge of the drawer 137' corresponding to the edge 127' of the ledgers 127 is adapted to serve the same function as the ledgers in providing additional stability for the support 122 relative to the yoke 115.

This modification also includes a curved adjustable backrest 138 for the operator. The backrest is formed from a substantially rectangular curved sheet of wood or the like. It is supported in position by a pair of jaw clamps 139 one of which is attached to each side of the backrest and which are adapted to engage a rail 140 attached to the back member 110. The rail is substantially U-shaped and has flanges 141 which are clasped by the jaws 142 of the clamps and are biased toward each other by a spring member 143 compressed by the jaws. In carrying position the backrest is lowered to within the sides of the upper section and may be readily adjusted to the desired height by releasing the engagement between the jaw members and the rails.

Attached to the underside of the support 122 and at the extremity furthest from the hinge 123 is a locking toggle 144 which includes toggle bolts 145 and a turning bar 146 to which is attached a handle 147. The ends of the bolts are adapted to be received in apertures 148 in the ears or projections 112' and 113' of the sides 112 and 113. To lock the support relative to the upper section it is positioned so that the ends of the bolts 145 may enter the apertures 148 and the handle 147 is then rotated to move the bolts outwardly. In setting up the device the handle is rotated in the opposite direction and the bolts withdrawn from the apertures so that the support 122 is free to rotate about the hinge 123.

The invention also contemplates the provision of a mount for a typewriter which is adjustable in size to accommodate machines of various dimensions and which is so designed that a typewriter secured thereto may be moved relative to the support to which the mount is attached in order that the typist may place the machine in the most comfortable position.

Figs. 18 to 20 illustrate in detail a mount of the type indicated in Fig. 5 which is adapted to adjustably secure a typewriter to the supporting surface 22. A modified form of the mount is illustrated in Figs. 24 to 26.

Referring to the drawing, the mount 50 comprises an elongated channel member 51 having a longitudinal flange 52 with an offset portion 53 extending from either side. The web 54 of the channel member 51 has a plurality of spaced alined slots 55 which are adapted to receive a locking or positioning means later to be described. Fasteners 56 extend through the flanges 52 of the channel members for attaching the member to the desk or support 22.

A first supporting member 57, of channel cross section, has a channel leg member 58 extending from either extremity thereof, each of the legs being attached to an end of a pair of elongated track members 59 which slidably receive the offset portions 53 of the member 51. The tracks may be attached to the leg members by welding or the like, and braces 60 are provided for additional strength in the joint between the two.

A second supporting member 61 of substantially the same size and configuration as the member 57 has leg members 62 extending from its extremities, the leg members being of smaller cross section than the legs 58 of the first channel member for telescopic engagement with the legs.

A positioning member or latch 63 is pivotally attached by a hinge 64 to an ear 65 of the leg 58 of member 57. The member 63 is provided with spaced projections 66 which are adapted to be received in the slots 55 of the member 51. An upturned portion 67 of the member 63 is adapted to engage a flange 51' of the member 51 to position the same and the portion 67 and flange 51' are provided with alined apertures 67' through which a lock 68 or the like is adapted to pass for preventing movement of the supports 57 and 61 on the base member.

In using the device just described the members 57 and 61 are telescopically adjusted relative to each other to correspond to the spacing of the typewriter legs and suitable fasteners are passed through the typewriter legs and the slots in the web portion of the members 57 and 61 so that the machine is firmly secured. It is contemplated that the tool-engaging portion of the fasteners be placed within the channel members so that the fasteners may not be removed unless the channel members are first removed from the base 51. The machine may now be adjusted back and forth on the offset flanges 53 and positioned at a comfortable distance from the operator. After use the supports 57 and 61 may be moved relative to the member 51 until the flanges 51' and 67 are in contact and a lock may be positioned in their apertures to prevent further movement of the machine. This prevents removal of the machine from the support and if the support is attached to or part of a relatively immovable structure will tend to discourage unlawful removal of the machine.

After the machine is adjusted on the mount relative to the operator the projections 66 of the member 63 may be engaged with the pair of slots 55 of the member 51 which are nearest to the member 63. This prevents relative movement between the typewriter supporting members and the channel member 51 which is attached to the typewriter desk. After using the machine the projections 66 may be disengaged from the slots 55 and the mount returned to the position shown in Fig. 19 for locking.

A modified form of mount 70 is shown in Figs. 21 to 23 and includes a relatively broad base portion 71 having an upturned flange 72 at one extremity which serves as a guide and a locking means for the movable members of the mount to be described. At the other extremity an inwardly bent flange 73 is provided which has a portion 74 substantially parallel to the base 71 and a lip 75 which facilitates assembly of the device.

A first supporting member 76 of channel cross section has an elongated slot 77 by means of which the legs of a typewriter may be secured to the support. Channel shape leg members 78 and 79 extend from either extremity of member 76 and telescopically receive the channel leg members 80 and 81 of a second support 82 having an elongated slot 83 for reception of fastening members in order to secure a typewriter thereto. An angle member or clip 84 is attached to the member 71 to position the legs 78 and 80 of the members 76 and 82 relative to the base 71.

For attaching the base to the desk and supporting member 22 a plurality of aligned elongated slots 85 are provided or if preferred the aligned holes 86 may be used. Suitable fastening means 87 may extend through the desk 22 and the slots of the base 71 for securing the same to the support.

An L-shaped locking member 88 is attached to the leg 78 of member 76 and is provided with a relatively broad elongated portion 89 and a U-shaped flange 90. The U-shaped flange 90 is provided with a plurality of spaced apertures 91 which are adapted to cooperate with similarly spaced apertures 72' in the flange 72 of the base 71. In assembling the members 76 and 82 relative to the base member 71, the lip 75 of the flange 73 of the base permits the portion 74 to pass the legs 79 and 81 of the supports.

In the use of a mount, fasteners passed through the desk and the support 22 may engage the spaced holes 86 or the elongated slots 85 in the base portion 71 of the mount. If the elongated slots are used then the machine may be adjustably positioned after the fasteners are engaged with the desk. The typewriter is then attached to the supports 76 and 82 which are spaced apart in accordance with the spacing of the fastener receiving slots of the typewriter legs. After fastening the typewriter to the supports, the supports may be assembled relative to the base portion. In assembling the supports relative to the base portion, the legs 79 and 81 are first placed under the lip 75 of the flange 73 and the legs are then moved to engagement with the flange 73 and portion 75 thereof and at the same time U-shaped portion 91 of the member 88 is engaged with the flange 72 of the base 71. To remove the base the reverse procedure is carried out, the U-shape 91 of the member 88 being lifted out of engagement with the flange 72 of the base 71 and the support members then pushed past the lip 75. To lock the typewriter and the supports to the base a lock is fitted through the slots 72' and 91 of the U-shaped portion and flange.

Figs. 24 to 26, inclusive, illustrate a mount similar to that shown in Figs. 18 to 20 having a modified form of releasable positioning means. It has been pointed out in connection with the previous drawings that the framework, consisting of the members 57 and 61 is adapted to be slidably movable relative to the fixed base member 51.

For the purpose of positioning the movable members relative to the fixed member, a latch member 160 is provided. The latch includes a hinged projection or pin 161 which is connected to the movable members and which is adapted to enter any one of a series of spacer apertures 162 in the member 51.

The latch includes an upwardly open main channel member 163, a leg 164 of which is fastened to the leg 59 of the member 57. At one extremity of the channel member a leaf 165 is riveted or otherwise attached to the web of the channel member and has offset pin receiving ears 166. A hinge portion 167 of a grooved channed member 168 is received between the ears 166 and the hinge pin 169 passed through the axes thereof in order that pivotal engagement between the members 168 and 165 will be provided. The member 168 has side portions 170 in each of which an inclined groove 171 is formed, the groove having one extremity near the web of the pin at the hinged end and the other extremity spaced from the web at the other extremity of the member. The pin 161 is secured to the web adjacent the free end of the member.

A U-shaped push-bar 172 having a web 173 and side members 174 spaced apart sufficiently to receive the sides of the channel member 168 is slideably supported by the channel member 163. An actuator pin 172' is carried between the side members 174 and in engagement with the grooves 171. A push-rod 174 is attached to the U-bar at the lower portion of its web and has a handle 175 at the other end, the bar 172 and rod 174 forming a substantially Y-shaped member.

Spaced just above the rod 174 is a leaf member 176 having a flange 177 at one end and a projection 178 at a side which is secured to the side 164 of the member 163 at the extremity away from the member 165. The fixed member 176 is provided with an aperture 176' in its projection 177 and the slideable push bar 172 is provided with an aperture 172'' in its web 173. A tension spring 179 has an end fastened in each of these apertures.

In the operation of the device which is shown in Figs. 24 to 26, the member 174 is urged toward the right in the drawings which moves the attached slideable member 172 in that direction. The pin 172' carried by the member and riding in the slots 171 of the member 168 causes the member 168 to rotate in a clockwise direction as viewed in the drawing, because of the force exerted on the edges defining the slot. Rotation of the member 168 in this direction moves the attached pin 161 out of slot 162 thus releasing the movable members of the framework. After positioning the framework as desired, and with the pin in position to be received by a spaced aperture 162, the rod 174 is released so that spring 179 may retract the slidable member 172 to produce counter-clockwise rotation of the member 168 and urge the pin 161 into the aperture.

It will be apparent that this portion of the invention provides means for a fastening element adapted to be engaged by the fixed portion of the support in order that the carriage may be readily positioned in accordance with the desires of an operator.

It will be obvious to those skilled in the art that various changes may be made in the invention without departing from the spirit and scope thereof and therefore the invention is not limited to that which is shown in the drawing and described in the specification but only as indicated in the appended claims.

What is claimed is:

1. A carrying case for a typewriter comprising a substantially rectangular container of upper and lower mating sections of similar configuration; the lower section including perpendicular rectangular rear and bottom wall members, substantially parallel trapezoidal side members, one having a notch in a portion thereof, and a relatively narrow top wall member substantially parallel to the bottom member, the upper section comprising perpendicular rectangular rear and bottom wall members, parallel substantially triangular side members, one having a portion for reception in the notch of the bottom side wall member; the upper and lower sections being pivotally attached at the free edge of the top wall member of the lower section and the free edge of the bottom wall member of the upper section, whereby the members may be closed to form a substantially rectangular container or open so that a portion of the bottom wall member of the upper section rests on the upper wall of the lower section to provide a seat for an operator; a supporting bracket with an arm attached to a side wall of the upper section, and a support for a typewriter pivotally attached to the arm of the bracket, whereby a typewriter may be attached to the support and positioned within the carrying case when it is in closed position and whereby the typewriter may be operatively supported in spaced relation from the seat provided by the sections.

2. A carrying case for a typewriter comprising a container of mating sections; the lower section including perpendicular rectangular rear and bottom wall members, substantially parallel trapezoidal side members, one having a notch in a portion thereof, and a relatively narrow top wall member substantially parallel to the bottom member; the upper section comprising perpendicular rectangular rear and bottom wall members, parallel substantially triangular side members, one having a portion for reception in the notch of the bottom side wall member; the sections being pivotally attached whereby the members may be closed to form a container or open so that a portion of one section rests on the other section to provide a seat for an operator; a supporting bracket with an arm attached to a side wall of one section, and a support for a typewriter pivotally attached to the arm of the bracket, whereby a typewriter may be attached to the support and positioned within the carrying case when it is in closed position and whereby the typewriter may be operatively supported in spaced relation from the seat provided by the sections.

3. A carrying case for a typewriter or the like, comprising a substantially rectangular container of upper and lower separable sections, means for positioning the upper section on the lower section to form a seat, a support attached to the upper section and having an arm spaced from the seat, and a platform pivotally attached to the arm and adapted to support a typewriter or the like, whereby spaced supports for a typewriter or the like and an operator are provided.

4. A carrying case for a typewriter or the like, comprising a substantially rectangular container of upper and lower separable sections, means for positioning the upper section on the lower section to form a seat, a yoke support mounted on the upper section by a lower arm thereof and having an upper arm thereof spaced above the seat, and a platform movably attached to the arm and adapted to support a typewriter or the like, whereby spaced supports for a typewriter or the like and an operator are provided.

ROBERT E. HERRICK.

References Cited in the file of this patent

UNITED STATES PATENTS

| Number | Name | Date |
| --- | --- | --- |
| 143,611 | Boyer | Oct. 14, 1873 |
| 397,938 | Richardson | Feb. 19, 1889 |
| 960,524 | Elkin | June 7, 1910 |
| 1,337,545 | Corning | Apr. 20, 1920 |
| 1,382,393 | Smith | June 21, 1921 |
| 1,551,516 | McGovern | Aug. 25, 1925 |
| 1,769,384 | Nicoll | July 1, 1930 |
| 1,858,778 | Horton | May 17, 1932 |
| 1,894,483 | Dowd | Jan. 17, 1933 |
| 1,951,960 | Anduaga | Mar. 20, 1934 |
| 2,390,987 | Cabrera | Dec. 18, 1945 |
| 2,547,754 | Herrick | Apr. 3, 1951 |